Figure 1:
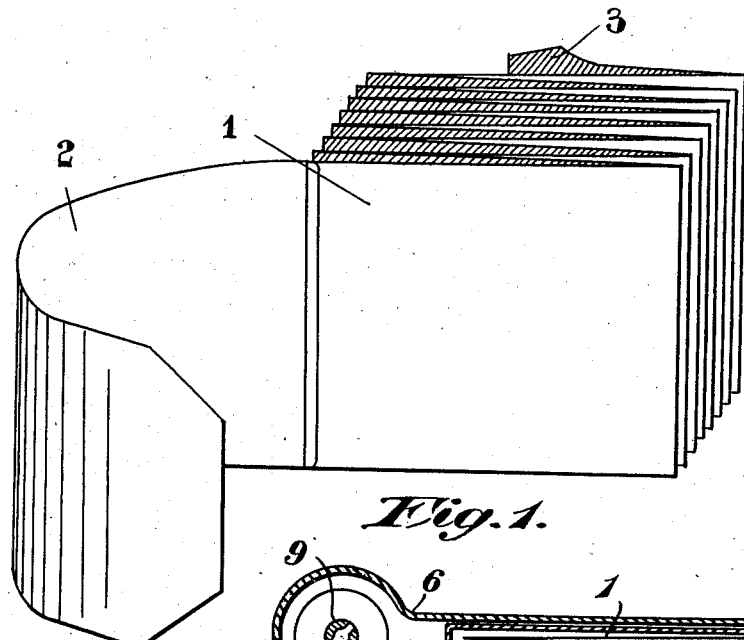

S. COCANARI.
SENSITIZED PHOTOGRAPHIC FILM AND MEANS FOR CARRYING AND EXPOSING SAME.
APPLICATION FILED APR. 25, 1913.

1,140,877. Patented May 25, 1915.

Witnesses:
P. F. Nagle.
H. E. Dieterich

Inventor:
Silvio Cocanari.
By Wiedersheim & Fairbanks
Attorneys.

UNITED STATES PATENT OFFICE.

SILVIO COCANARI, OF VIEUX-DIEU, NEAR ANTWERP, BELGIUM.

SENSITIZED PHOTOGRAPHIC FILM AND MEANS FOR CARRYING AND EXPOSING SAME.

1,140,877.

Specification of Letters Patent.

Patented May 25, 1915.

Application filed April 25, 1913. Serial No. 763,506.

*To all whom it may concern:*

Be it known that I, SILVIO COCANARI, technician, a citizen of the Kingdom of Italy, and resident of Vieux-Dieu, near Antwerp, Belgium, have invented certain new and useful Improvements in Sensitized Photographic Films and Means for Carrying and Exposing Same; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

My invention relates to sensitized photographic films and more particularly to improved means for carrying and exposing same.

The object of the invention is to provide improved carrying and exposing means specially adapted for a length of sensitized photographic film folded in zig-zag form in such manner that the folds of the sensitized surface contact with one another.

Under this invention the use of backing material for the sensitized film is avoided and the unfavorable effect resulting from parts of the sensitized surface contacting with the granular surface of such material obviated.

The invention consists in certain features of construction and combinations of parts hereinafter described, and specified in the claims.

The drawing appended hereto illustrates a practical example of my invention.

Figure 3:
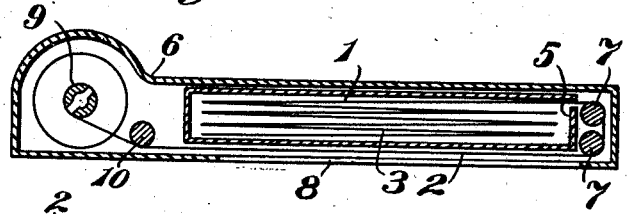
Figure 4:
Figure 2:
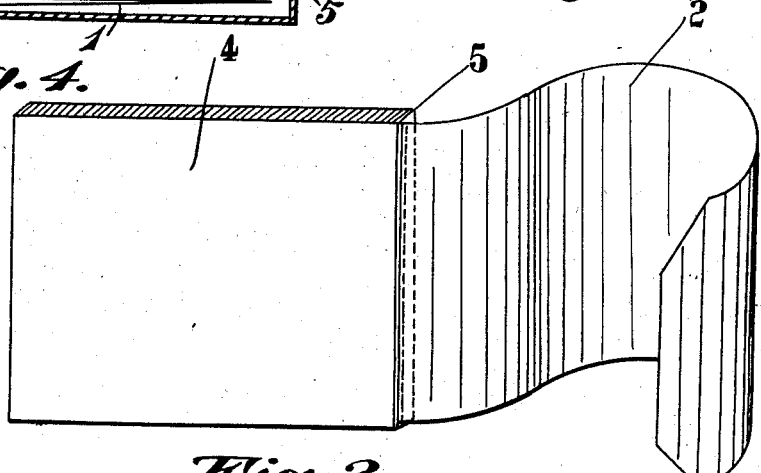

Figure 1 is a perspective view illustrating the sensitized film in folded position. Fig. 2 is a perspective view of the carrying box with the folded film therein. Fig. 3 is a section through a photographic holder with the box carrying the folded film inserted therein. Fig. 4 is a section showing how a plurality of films can be carried simultaneously.

The same reference letters wherever repeated indicate the same or similar parts.

The film 1, sensitized on one side and of a width appropriate to the size of the photographic apparatus used, is folded in zig-zag form, as shown by Fig. 1, and in such manner that the sensitized parts contact with one another while the non-sensitized parts also contact with one another. To facilitate the folding of the film the same is preferably perforated across its width at suitable intervals. Strips of opaque paper, 2 and 3, are secured, in any suitable manner, to the ends of the sensitized film, and the latter is then inserted into a box 4 in such manner that the strip of opaque paper, 2, projects through a slit in the end-wall 5 of said box. The box is thereafter sealed and the sensitized film is then ready for use.

When it is desired to use the film the box 4, is fixed within a holder 6 and the projecting strip of opaque paper 2, with the film attached, is passed around rollers 7, and 10, and partly wound on to the drum 9.

8 indicates the exposure opening in the holder 6, which latter is or may be provided with the usual slide or shutter. After exposure, each succeeding part of the film is wound on to the drum 9 which may be rotated in any suitable manner and these exposures are continued until the whole film is wound on the drum. By further rotation of the drum 9 the strip 3 is also wound thereon and serves to protect the exposed film from the light so that the holder 6 may be opened and recharged.

Instead of using a holder the box containing the film and the mechanism for winding the film may be located in the camera itself. If desired several films 1 may be stored in one box 4, as shown at Fig. 4. In this case the strips of opaque paper 2, pass through slits in the end wall 5 of the box, and the different films are wound successively on the drum 9, in the manner already described.

From the foregoing description it will be obvious to anyone skilled in the art that the film can be inserted in the holder, and removed therefrom either before or after exposure without the necessity of a dark room.

Having now fully described my invention what I claim and desire to secure by Letters Patent is:—

1. In combination, a length of sensitized photographic film folded upon itself so that the folds of the sensitized surface contact with one another, means for carrying said film, and means for exposing the same.

2. In combination, a length of sensitized photographic film folded upon itself so that the folds of the sensitized surface contact with one another, means for carrying said film, a holder for same, and means for exposing said film.

3. In combination, a length of sensitized photographic film folded upon itself so that the folds of the sensitized surface contact with one another, opaque material on the ends of said film, a box for said film provided with a slit through which the opaque material on one end of the film projects, means for holding said box and means for exposing said film.

4. In combination, a length of sensitized photographic film folded upon itself so that the folds of the sensitized surface contact with one another, opaque material on the ends of said film, a box for said film provided with a slit through which the opaque material on one end of the film projects, a holder for said box and means in said holder whereby said film may be exposed as desired.

5. In combination, a length of sensitized photographic film folded upon itself so that the folds of the sensitized surface contact with one another, opaque material on the ends of said film, a box for said film provided with a slit through which the opaque material on one end of the film projects, a holder for said box provided with an opening, and means for unfolding the film and presenting same before the opening in said holder.

6. In combination, a length of sensitized photographic film folded upon itself so that the folds of the sensitized surface contact with one another, opaque material on the ends of said film, a box for said film provided with a slit through which the opaque material on one end of the film projects, a holder for said box provided with an opening, rollers in said holder, a drum in said holder, and means for rotating said drum to wind the projecting strip of opaque material and the film over said rollers before said opening and on to said drum, substantially as set forth.

In testimony whereof I affix my signature in presence of two witnesses.

SILVIO COCANARI.

Witnesses:
　PAUL BART,
　U. DEFÉVRIMONT.